Sept. 28, 1948.  J. W. HOBBS  2,450,141
PORTABLE HAND LIGHT
Filed Aug. 19, 1947  2 Sheets-Sheet 1
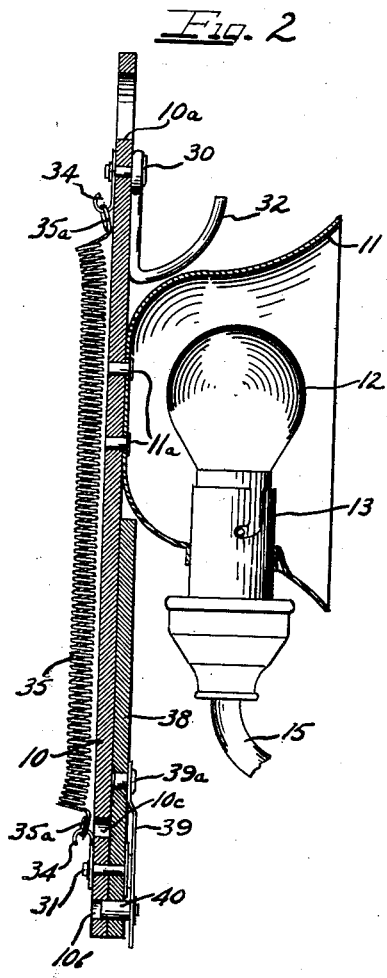
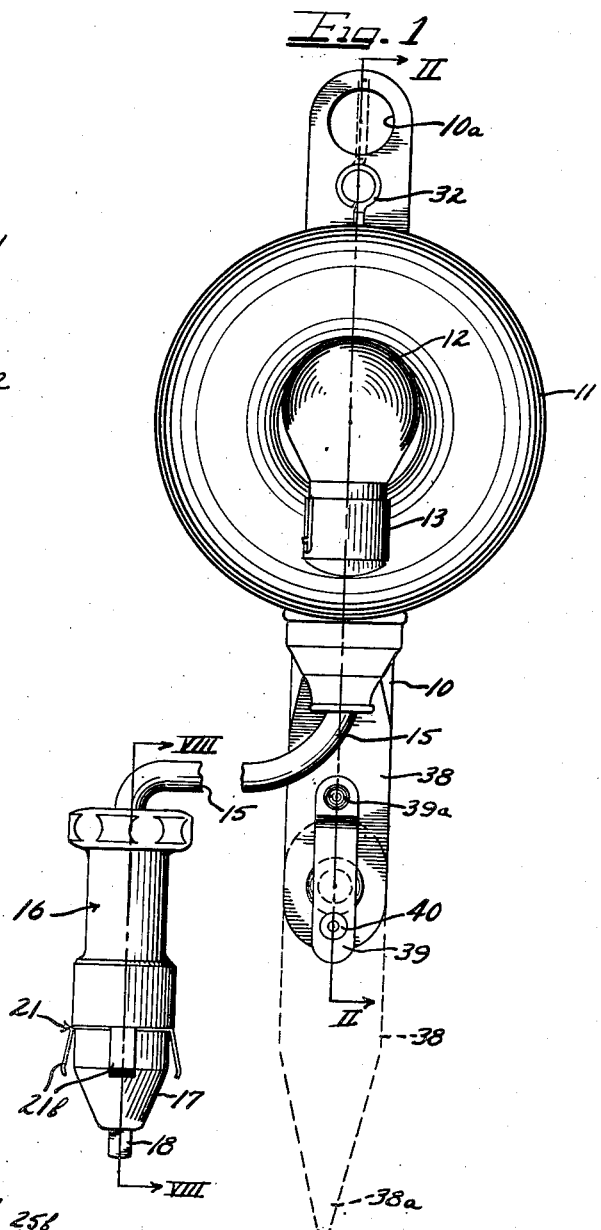
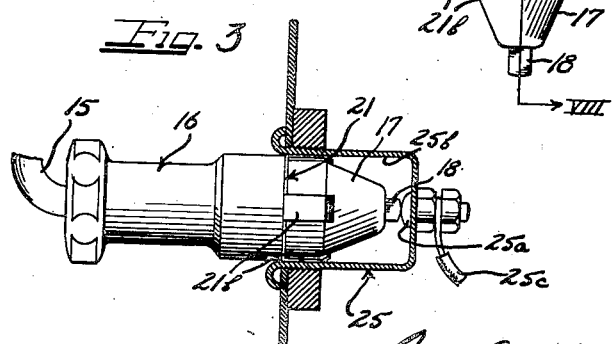
Inventor
JOHN W. HOBBS Sept. 28, 1948.   J. W. HOBBS   2,450,141
PORTABLE HAND LIGHT
Filed Aug. 19, 1947   2 Sheets-Sheet 2
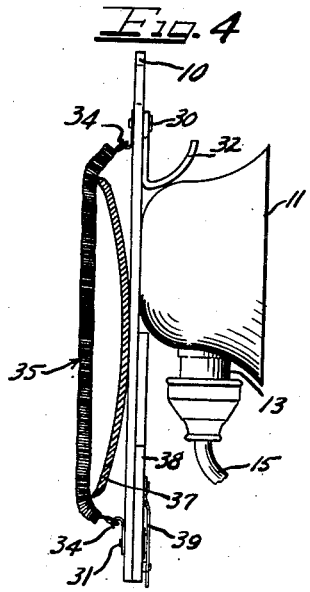
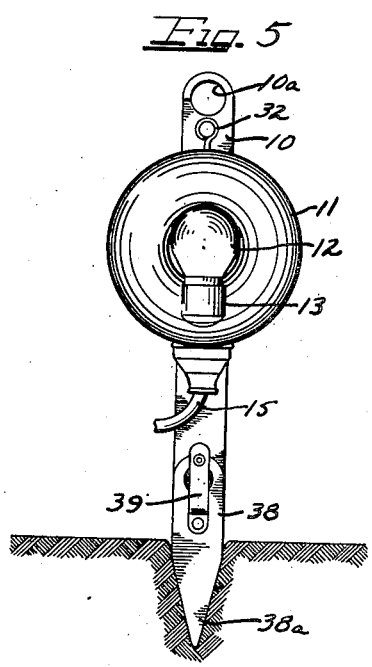
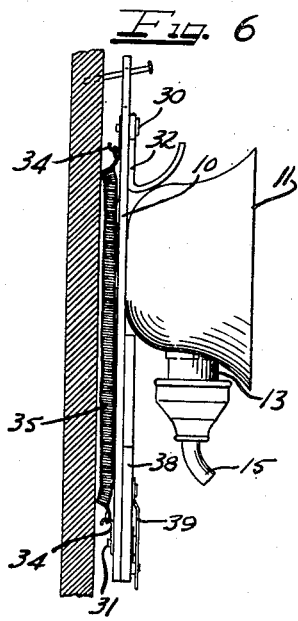
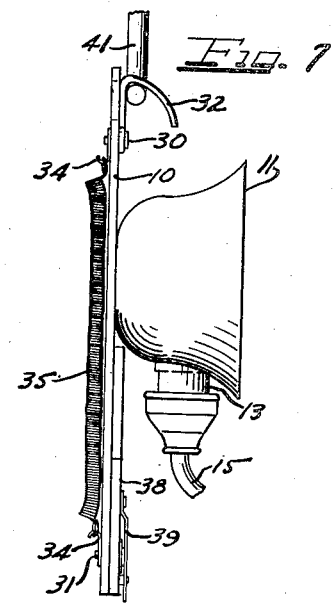
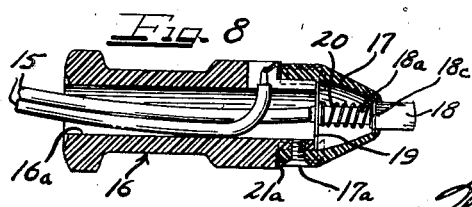
Inventor
JOHN W. HOBBS Patented Sept. 28, 1948

2,450,141

UNITED STATES PATENT OFFICE 2,450,141

PORTABLE HAND LIGHT

John W. Hobbs, Springfield, Ill., assignor to John W. Hobbs Corporation, Springfield, Ill., a corporation of Illinois Application August 19, 1947, Serial No. 769,463

3 Claims. (Cl. 240—8.18)

This invention relates to an illuminating device, and particularly to a general purpose and trouble light for use in connection with automobiles, tractors, motor boats, motorcycles, aircraft, and similar vehicles, containing a battery source of electrical energy.

A particular feature of a light embodying this invention is the provision of a terminal plug which may be inserted into the cigarette lighter receptacle of any modern car to thereby connect the light for energization by the battery of the automobile.

A further feature of this invention is the provision of an improved supporting plate for an electric trouble light characterized by the incorporation with such supporting plate of a plurality of different types of fixtures to insure that the light may be attached to any desired part of a vehicle, conveniently carried by hand, suspended in a building, or supported on the ground so as to direct a beam of light to a desired area under any conditions.

A particularly desirable feature of this invention is the provision of a ground spade device in conjunction with the supporting plate for a trouble light by which the light may be conveniently supported adjacent the ground to provide illumination for tire changing and similar emergency operations.

Accordingly, it is an object of this invention to provide an improved illuminating device, and particularly a battery operated electric light for emergency and general purpose illumination.

Another object of this invention is to provide a trouble light for use on automobiles, tractors, motor boats, motorcycles, aircraft, and similar vehicles, characterized by the provision of a plurality of convenient supporting devices in co-operation with the light to permit the light to be suspended from practically any type of support, conveniently carried by hand, or supported on the ground in a proper position for illuminating purposes.

A particular object of this invention is to provide a trouble light construction characterized by its ease of manufacture and assembly and by the ruggedness and durability of such assembly.

The specific nature of the invention, as well as other objects and advantages thereof, will become apparent to those skilled in the art from the following description of the annexed sheets of drawings, which, by way of preferred example only, illustrate one embodiment of this invention.

On the drawings:

Figure 1 is an elevational view of an assembled trouble light embodying this invention, with the alternative position of the ground spade element indicated by dotted lines;

Figure 2 is a vertical sectional view taken on the plane II—II of Figure 1;

Figure 3 is a schematic view illustrating the co-operation of the terminal plug of the trouble light with a conventional form of cigarette lighter receptacle as found in modern vehicles;

Figure 4 is a side elevational view of the trouble light assembly illustrating the manner in which the light may be supported upon an element such as the bumper of an automobile;

Figure 5 is an elevational view of the trouble light assembly indicating the manner in which the light may be supported on the ground by the ground spade element thereof;

Figure 6 is a view similar to Figure 4 but illustrating the manner in which the light may be supported upon a nail or similar projection;

Figure 7 is a view similar to Figure 6 but illustrating the manner of support of the light assembly upon a hook or bar element; and Figure 8 is a sectional view taken on the plane VIII—VIII of Figure 1, illustrating the details of construction of the terminal plug of the trouble light.

As shown on the drawings:

A light embodying this invention comprises a supporting plate 10 upon a medial portion of which a sheet metal reflector 11 is suitably secured as by rivets 11a. A light bulb 12 is supported in any conventional manner within the confines of reflector 11 as by a socket 13 which projects through a suitable aperture in the side walls of reflector 11 and is suitably secured therein either by a press fit or by spot welding. A cord 15 is provided having conventional connections with the lamp terminals (not shown) of the socket 13 and the other end of cord 15 has a terminal plug 16 secured thereto.

As best shown in Figure 8, the terminal plug 16 comprises a hollow body of insulating material having a central bore 16a into which the two conductors of the cord 15 extend. An ogival-shaped cap 17, also of insulating material, is secured to the end of terminal plug 16 as by screws 17a and at its forward end, defines a relatively small aperture through which a metallic terminal element 18 projects. Terminal 18 has a reduced diameter stem portion 18a projecting rearwardly and slidably supported in a central aperture in a plate 19 which is secured across the front end of terminal plug 16 by the assemblage of the ogival cap 17 thereto. A spring 20 operates between plate 19 and the head portion 18b of terminal 18 to urge the terminal outwardly. Outward movement of the terminal is limited by a flange 18c which engages the walls of the forward opening in the ogival cap 17. The other terminal element 21 has an annular body portion 21a which is secured in assembly between the terminal plug body 16 and the ogival cap 17. In addition, terminal element 21 has a plurality of circumferentially spaced, resilient, axially forwardly and outwardly projecting finger portions 21b which cooperate with the interior surfaces of a cigarette lighter receptacle 25 of the type found on modern cars, in the manner shown in Figure 8. The other conductor of cord 15 is of course electrically connected to terminal element 21.

Referring to Figure 8, it will be observed that when the terminal plug 16 is inserted in a cigarette lighter receptacle 25, the forwardly projecting terminal element 18 engages the central terminal 25a of the cigarette lighter receptacle and is urged rearwardly against the bias of spring 20. The resilient finger portions 21b engage the walls 25b of the receptacle 25 in a sliding contact at a plurality of points, thereby assuring the establishment of good electrical contact with the frame or ground of the particular vehicle. It will, of course, be understood that the "hot" terminal 25a of the cigarette lighter receptacle is connected by a suitable conductor 25c to the outside of a battery carried by the vehicle.

It should be particularly understood that the terminal plug 16 constitutes only a preferred arrangement for conveniently effecting the energization of the trouble light embodying this invention; such plug may obviously be replaced by any other type of connector or by a pair of metallic clips for establishing energization of the lamp by connecting such clips respectively to a hot terminal of the battery and the frame of the vehicle.

In accordance with this invention, the base plate 10 is provided with a plurality of attachment fixtures so as to permit the plate to be properly supported in practically any desired position or location. Also, it will be recognized that the base plate 10 is so shaped as to permit it to be conveniently inserted into the pocket of the user. Thus, at the top of the plate 10 there is provided an enlarged aperture 10a by which the light may be hung upon projecting nails, hooks, or the like, in the manner illustrated in Figure 6.

A pair of rivets 30 and 31 are respectively secured in transverse relationship to the base plate 10 on opposite sides of the position of the reflector 11. Such rivets project a slight distance beyond each face of the plate 10. On that portion of the rivet 30 projecting through the front face of base plate 10, a hook 32 is swivelly mounted. The hook 32 thus permits the light to be supported in depending relationship from any type of supporting hanger or hook 41 in the manner illustrated in Figure 7. It should be particularly noted that the swivel mounting of the hook 32 permits it to be readily shifted to an out of the way position shown in Figure 4 when the lamp is supported by any of the other supporting elements.

On those portions of the rivets 30 and 31 which project through the back face of the base plate 10, a pair of retaining hooks 34 are respectively secured. An extensible strap-like element, for example, a stainless steel spring 35, is then connected between the support hooks 34 as by having ring end portions 35a slipped over such hook portions. The spring 35 permits the light to be conveniently fastened to the hand, wrist or arm of the user merely by inserting the hand between the spring 35 and the back face of base plate 10. In addition, the spring 35 permits the light to be conveniently suspended upon the end of a conventional car bumper 37 in the manner indicated in Figure 4. Hence the light embodying this invention may be conveniently used either as an emergency headlight or tail light for the vehicle.

On that portion of rivet 31 which projects through the front face of base plate 10, an extension ground spade element 38 is pivotally mounted. The ground spade 38 has a sharpened end portion 38a which, when the spade 38 is pivoted about rivet 31 to the projecting position illustrated in Figure 5, will permit the ground spade element to be forced into the ground and thus support the light a substantial distance above the ground in proper position for illumination required for changing tires or similar emergency work.

To resiliently retain the ground spade element 38 in either its projected or retracted positions, a leaf spring 39 is provided, having one end secured to ground spade 38 by a rivet 39a and the other end thereof carrying a detent 40 which projects through a suitable aperture in ground spade 38 and is urged by the spring 39 into selective engagement with either an aperture 10b or 10c provided on base plate 10 in positions corresponding to the location of detent 40 in the retracted and extended positions of the ground spade 38 respectively. Hence in either position of the ground spade element 38, it is rigidly secured to the base plate 10 and permits the light unit to be manipulated with a maximum of convenience.

From the foregoing description, it will be apparent that this invention provides an unusually economically manufacturable trouble light assembly which is adaptable to a wide variety of uses both under emergency conditions and for ordinary illumination.

It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. A portable electric lamp comprising an elongated base plate, a reflector secured to a medial portion of said base plate, means for supporting a light bulb within said reflector, a pair of pins transversely secured to said plate and respectively disposed on opposite sides of said reflector, a pair of hooks respectively secured to said pins on one face of said plate, an extensible strap on one face of said plate, an extensible strap secured between said hooks, a hanger pivotally secured to one of said pins on the other face of said plate, and a support stick pivotally secured to said other pin on said other face of the plate.

2. A portable electric lamp comprising an elongated base plate, a reflector secured to a medial portion of said base plate, means for supporting a light bulb within said reflector, a pair of pins transversely secured to said plate and respectively disposed on opposite sides of said reflector, said pins projecting beyond said plate on both faces thereof, an extensible spring secured between the projecting portions of said pins on one face of said plate, a hanger hook pivotally secured to the projecting portion of one of said pins on the other face of said plate, and a support stake pivotally secured to the projecting portion of said other pin on the other face of said plate.

3. A portable electric lamp comprising an elongated base plate, a reflector secured to a medial portion of said base plate, means for supporting a light bulb within said reflector, a pair of pins transversely secured to said plate and respectively disposed on opposite sides of said reflector, said pins projecting beyond said plate on both faces thereof, an extensible spring secured between the projecting portions of said pins on one face of said plate, a hanger hook pivotally secured to the projecting portion of one of said pins on the other face of said plate, and a support stake pivotally secured to the projecting portion of said other pin on the other face of said plate, the free end of said stake being pointed for insertion into the ground, and spring pressed detent means for rigidly securing said stake to said plate with said pointed end in projecting relation thereto.

JOHN W. HOBBS.

REFERENCES CITED

The following references are of record in the file of this patent:

UNITED STATES PATENTS

| Number | Name | Date |
| --- | --- | --- |
| 568,592 | Van Riper | Sept. 29, 1896 |
| 711,501 | Hutchins | Oct. 21, 1902 |
| 1,933,337 | Piombo | Oct. 31, 1933 |
| 2,233,053 | Hart | Feb. 25, 1941 |
| 2,236,435 | Lockshin | Mar. 25, 1941 |